United States Patent [19]

Bickar et al.

[11] Patent Number: 4,751,068

[45] Date of Patent: Jun. 14, 1988

[54] METHOD FOR CATALYZING OXIDATION/REDUCTION REACTIONS OF SIMPLE MOLECULES

[75] Inventors: David Bickar, Baltimore, Md.; Celia Bonaventura; Joseph Bonaventura, both of Beaufort, N.C.

[73] Assignee: Duke University, Durham, N.C.

[21] Appl. No.: 648,952

[22] Filed: Sep. 10, 1984

[51] Int. Cl.$^4$ .................. C01B 31/20; B01J 31/00
[52] U.S. Cl. .................. 423/437; 423/352; 423/371; 423/385; 423/387; 423/388; 423/402; 423/406; 423/415 R; 423/415 A; 423/443; 423/563; 423/580; 502/163; 564/463; 564/500
[58] Field of Search .............. 423/573 R, 573 G, 576, 423/230, 246, 247, 224, 574 R, 574 G, 437; 502/163

[56] References Cited

U.S. PATENT DOCUMENTS

| | | | |
|---|---|---|---|
| 3,097,925 | 7/1963 | Pitts, Jr. et al. | 423/573 |
| 3,471,254 | 10/1969 | Urban | 423/515 |
| 3,878,080 | 4/1975 | Luck | 204/415 |
| 3,972,988 | 8/1976 | Urban | 423/573 R |
| 3,978,137 | 8/1976 | Frame | 423/573 R |
| 3,982,897 | 9/1976 | Scheinberg | 422/89 |
| 4,011,304 | 3/1977 | Mancini et al. | 423/573 G |
| 4,071,037 | 1/1977 | Scheinberg | 435/25 |
| 4,278,646 | 7/1981 | Lynn et al. | 423/573 G |
| 4,443,423 | 4/1984 | Olson | 423/573 G |
| 4,443,424 | 4/1984 | Olson | 423/573 G |
| 4,487,753 | 12/1984 | Massie et al. | 423/573 R |
| 4,587,216 | 5/1986 | Patel et al. | 435/189 |

FOREIGN PATENT DOCUMENTS 880453 11/1981 U.S.S.R. .................. 423/573 R

OTHER PUBLICATIONS

West et al, Textbook of Biochemistry, McAmillian Co NY,NY 1966 pp. 594–597, 610–621 912–913.
Colby et al, Applications of CO Utilizing Microorganisms Trends in Biotechnology, vol. 3, 1985 pp. 12–17.
Ragsdale et al., Acetate Biosynthesis by Acetogenic Bacteria J. Biol. Chem. 260 (7) 1985 pp. 3970–3977.
Bickar et al, Cardon Monoxide-Driven Reduction of Ferric Heme and Heme Proteins, J. Biol Chem. 259(17) 1984 pp. 10777-100783.
Carbon Monoxide-Medical and Biological Effects of Environmental Pollutants, National Acadamy of Science, Washington DC, 1977, p. 68.

*Primary Examiner*—Gary P. Straub
*Attorney, Agent, or Firm*—Oblon, Fisher, Spivak, McClelland & Maier

[57] ABSTRACT

This invention relates to a method for catalyzing the reactions $$QZ + H_2X \rightarrow QZX \qquad (1) \text{ ps}$$

and

$$QZX \rightarrow QZ + H_2X \qquad (2)$$

wherein Q=C or N;
Z=O or S;
X=O, S, NH or NR;
R=$C_1$ to $C_8$ alkyl which may be linear, branched or cyclized, which comprises:

contacting at least one polydentate nitrogen-containing chelating agent complexed with a metal atom with the reactants of one of said reactions, wherein said contacting takes place in the presence of a means for oxidizing when reaction (1) is catalyzed and in the presence of a means for reducing when reaction (2) is catalyzed.

18 Claims, 4 Drawing Sheets

METHOD FOR CATALYZING OXIDATION/REDUCTION REACTIONS OF SIMPLE MOLECULES

The Government has rights in this invention pursuant to Contract No. N00014-83-K-D016 awarded by the Office of Naval Research

BACKGROUND OF THE INVENTION

1. Field of the Invention

This invention relates to a method for catalyzing oxidation/reduction reactions based on polydentate nitrogen-containing chelating agents complexed with a metal atom.

(It must be noted that there is no universal agreement on the definition of "catalyst" or "catalyzing". Definition of the term "catalyst" varies depending on the art, for example, as between the fundamental investigator and the practitioner, and among researchers concerned with heterogeneous catalysis, homogeneous catalysis, polymerization reactions, and enzymes. In the present application a "catalyst" is defined as a substance that increases the rate of reaction and which may be regenerated or returned to its orginial state if it is transformed as the result of a catalytic reaction.)

2. Description of the Prior Art

The better known and studied catalytically active polydentate nitrogen-containing compounds are porphine-like molecules and their relatives (e.g., porphyrins). Porphine possesses a basic macrocyclic tetrapyrrole structure, illustrated below.

In many instances, porphine-based prosthetic groups are tightly or covalently bound to an apoenzyme, and complexed to an iron atom. In other instances Mg, Zn, Ni, Co, or Cu may be complexes to these prophines.

Proteins containing prophine-based prosthetic groups are known to perform diverse roles. They reversibly bind dioxygen for transport (hemoglobin and myoglobin), transfer electrons one at a time in membraneous respiratory chain (cytochromes), reduce peroxides (catalases and peroxidases), and act as terminal components in multi-enzyme systems involved in hydroxylation.

The catalytic functions of iron/porphine-proteins based on their metal centers are known. Two oxidation states of iron —$Fe^{2+}$ and $Fe^{3+}$—are known to be stable in aqueous solutions. These are the major redox forms of iron proteins.

The cytochromes are a group of iron-containing electron transferring proteins that act sequentially to transfer electrons from flavoproteins to oxygen. They all contain iron-porphine prosthetic groups. The cytochromes undergo reversible $Fe^{+2}$—$Fe^{+3}$ valence changes during their catalytic cycles. At least six types of cytochromes have been identified : cytochromes b, $b_5$, c, $c_1$, a, and $a_3$. These cytochromes are primarily differentiated by their different reduction potentials.

The hydroperoxidases are ferri-($Fe^{3+}$)-hemoproteins which have as preferred sustrates $H_2O_2$ (catalases) or alkyl peroxides (peroxidases). These enzymes act to oxidize phenols, aryl and alkyl amines, hydroquinones, ascorbate, cytochrome c, or glutathione.

In hemoglobins and myoglobins the iron atom does not undergo changes in valence as oxygen is bound or lost; it remains in the $Fe^{+2}$ state. Both hemoglobin and myoglobin can be oxidized, however, to the $Fe^{+3}$ forms, which are known as methemaglobin and metmyoglobin respectively.

Carbon monoxide combines with hemoglobin to form CO-hemoglobin. Each heme in hemoglobin can bind one carbon monoxide molecule but $O_2$ and CO cannot simultaneously bind to the same heme. The binding affinity for CO is about 200 times greater for carbon monoxide than for oxygen. Adventitious CO occupation of the heme position of a hemoglobin inactivates the heme.

It is known that when cytochrome c oxidase in the ferric, $Fe^{+3}$, form is stored under an atmosphere of carbon monoxide, the heme iron of cytochrome $a_3$ will become reduced to $Fe^{+2}$ and then bind CO. This reduction, accomplished under a CO atmosphere in the absence of other reactants, has been referred to as "autoreduction".

Young and Caughey (Fed. Proc., 1980, 39, 2090(Abstract 2562)) have demonstrated that $^{13}CO$ is oxidized to $^{13}CO_2$ by cytochrome c oxidase and $O_2$. This study also reveals that with $^{18}O_2$, $^{18}O$ is incorporated into the $CO_2$ product. On this basis, Young and Caughey have suggested that the oxidation of CO to $CO_2$ occurs via the following reaction:

$$\tfrac{1}{2}O_2 + CO \rightarrow CO_2.$$

Thus, although no accepted mechanism explaining how "autoreduction" occurs exists, the heme mediated oxidation of CO has been proposed to proceed via one of the two following pathways:

(1) Young and Caughey have suggested that the reaction is a concerted process, occurring with dioxygen and two molecules of CO so that each O atom from the dioxygen molecule ends up in the $CO_2$ molecules produced.

(2) Bickar, Bonaventura and Bonaventura (Biophysical Society Annual Meeting, 1982, Feb. 14–17, Boston, MA) have suggested that the reaction is a two step process which consists of an initial reduction of cytochrome c oxidase by CO releasing $CO_2$, followed by the oxidation of cytochrome c oxidase by $O_2$.

SUMMARY OF THE INVENTION

In accordance with the present invention, it has now been discovered that catalyst systems based on one or more polydentate nitrogen-containing chelating agents (herein after simply referred to as chelating agent) complexed with a metal atom are useful for catalyzing the reactions $$QZ + H_2X \rightarrow QZX \tag{1}$$

and $$QZX \rightarrow QZ + H_2X \tag{2}$$

wherein
Q=C or N;
Z=O or S;
X=O, S, NH or NR;
R=$C_1$ to $C_8$ alkyl group which may be linear, branched or cyclized.

(Note that a chelating agent complexed with a metal alone will hereinafter be referred to as a chelate.)

These and other objects of the invention as will hereinafter become more readily apparent have been accomplished by providing a means for transforming CO, CS, or NO into useful products. With the invention, a chelate capable of binding CO, CS, or NO in the presence of at least one $H_2X$ compound, is used to catalytically transform this CO, CS, or NO to an addition compound of CO, CS, or NO and $H_2X$. The present invention provides these transformations under mild condition.

The present invention further provides, under appropriate and similar condition, a catalyst system which is capable of catalyzing the reverse of these reactions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention is based on the redox catalytic activity of chelating agents complexed with a metal atom (hereinafter referred to as chelates).

The present invention arose, in part, as a result of studies carried out in the laboratory of the inventors who were investigating redox reactions of chelates having the following basic structure;

I.

-continued

II.

where M is a metal atom held in place (e.g., via complexation) in the plane of the chelating agent, as schematically illustrated in structure I, or somewhat above or below this plane, as schematically illustrated in structure II where M' and M" represent the variations in the position of the complexed metal atom.

The chelating agents of the invention are characterized by having a cyclic or cyclizable structure which is made up of at least C, N, and H atoms. This cyclic or cyclizable structure is further characterized by providing a means for chelating a metal atom. Such means can be multiple nitrogen atoms. These chelating agents act in combination with a metal atom with which they are complexed to promote oxidation/reduction reactions.

The metal atom can be located essentially in the plane of the chelating atoms (e.g., the nitrogen atoms) and may promote redox reactions without coming out of this plane. The metal atom, on the other hand, is not limited to the region of this plane and may leave its planar position during catalysis or remain outside of its planar position at all times. It will be recognized by those skilled in this art that variations in the oxidation state of a particular metal atom or variations based on the substitution of one metal atom for another can easily result in different relative locations of the metal atom.

The chelates of the present invention may possess different metal atoms such as, for example, Fe, Cu, Ni, Zn, Mg, V, Mo, Rb, Ag, Cr, Co, Ti, Mn, Pt, Pd, Ir, U, Re, Os, Sn, Ga, Al and Sb. Preferred metals are: Fe, Co, Al, V, Cr, Mn, Mo and Re.

These chelates can be used by themselves in solution or immobilized onto a solid or semi-solid support. (The word "immobilization" is used throughout this application to indicate that once specie is attached to another, generally larger specie. The term "immobilization" is well known and understood in this art to indicate that a multitude of smaller species are attached to a larger specie which acts to render these smaller species immobile in a medium in which they would have otherwise been free to move around like free solvated molecules move around in a solvent. In immobilizations some movement of the immobilized species is possible, but these immobilized species are never permitted to move completely independently of the support to which they are immobilized.) These supports may be chosen from supports which are well known in this art, e.g. glass, natural or synthetic fiber, gels, charcoal, ceramic materials, metals (e.g. Pt), metal oxides, natural or synthetic polymers, zeolites, silica compounds or alumina compounds. These supports also include a peptidic component. Any of these supports may, in turn, be immobilized themselves onto another solid or semi-solid support, such as, for example, glass, natural or synthetic fiber, gels, charcoal, ceramic materials, metals (e.g. Pt), metal oxides, natural or synthetic polymers, zeolites, silica compounds or alumina compounds.

The chelates of the present invention may also be attached to either a natural or a synthetic peptide. (The word "attached" throughout this application is meant to refer to the attachment of two species, e.g. a chelate and a protein, via at least one covalent bond, at least one ionic bond including salt bridges and hydrogen bonding, or at least one linking molecule. Such linking molecules most often contain two or three functional groups. The attachment of each of these functional groups to a different specie links these two species together.)

It will be recognized that by attaching these chelates to either a natural or a synthetic peptide moiety one may obtain synthetic proteins which can resemble closely or even perfectly a naturally occuring protein compound, such as a heme protein.

It must be further recognized, however, that this invention is not limited to synthesized protein compounds as described above. Naturally occuring protein compounds possessing the chelates of this invention may also readily be used as obtained naturally, or used after modification. Examples of such naturally occuring protein compounds are hemoglobin, methemoglobins, cytochromes, etc (vide infra).

It will also be recognized that a single generalized peptide structure containing at least two different chelates are included in this description. For example, a multiple-porphine-containing peptide structure having a different metal atom in at least two of the porphines can be used. Another example relates to a peptide structure containing multiple, but different, porphines. Such porphines may be all chelated to identical metal atoms but be differentiated either by the types of side chain groups disposed on the porphine structure or the proteinaceous environment of each porphine unit.

Some examples of useful phorphines or porphine derivatives are: bacteriochlorophyll a, bilirubin, biliverdin, chlorophyll a, chlorophyll b, chlorophyllin, coproporphyrin I, coproporphyrin I ethyl ester, coproporphyrin I isopropyl ester, coproporphyrin I n-propyl ester, coproporphyrin I tetramethyl ester, copropor- phyrin III tetramethyl ester, deuteroporphyrin IX, deuteroporphyrin IX dimethyl ester, mesoporphyrin IX, mesoporphyrin IX dimethyl ester, mesotetraphenylporphine, octaethylporphine, porphin, porphobilinogen, protoporphyrin IX, protoporphyrin IX dimethyl ester, meso-tetra(4-pyridyl) porphine, uroporphyrin ester, uroporphyrin ethyl ester, uroporphyrin I isopropyl ester, uroporphyrin I octamethyl ester, uroporphyrin I n-propyl ester, and Waldenstrom ester.

Useful chelate of the present invention are hemes, hemins, phythalocyanines, ethioporphyrins or sirohemes.

A wide variety of heme compounds are useful in the practice of this invention. By definition a heme compound is a modified heme.

A heme compound can be broken down into its porphine center and a component attached thereto. Such a component may be a peptide. The porphine may be substituted with varying organic side chain functionalities, sugars, starches, other natural or synthetic polymers, or halogens. If the component attached to the porphine is a peptide, this peptide component may be varied as desired and may be of natural origin or synthetic or semi-synthetic. It may be attached to the porphine via synthetic techniques or obtained from a natural source with the porphine already attached thereto. Note that the peptide component may be entirely absent from the porphine.

The heme compounds of the present invention can be obtained from natural sources or be derivatives thereof. Such derivatives may be obtained via the attachment of nonproteinaceous materials such as sugars, halogens, and other organic moieties to the heme compounds, or by the addition of proteinaceous material to the heme compound or removal of proteinaceous material therefrom. Heme compounds obtained via genetic manipulation technology and fermentation also fall within the scope of this invention and may be used in the practice thereof. All of these heme compounds may be structural and conformational variants of naturally occurring heme compounds. It will also be recognized that the naturally occurring iron atom found in these hemes may be exchanged for another metal atom.

The heme compounds of the present invention may be human or animal hemoglobins, myoglobins, metmyoglobins, methemoglobins, cytochromes, catalases, or peroxidases.

More specific examples of heme compounds which are useful in the present invention are, for example, α-chain of human hemoglobin, β-chain of human hemoglobin, cytochrome $a_3$, and cytochrome a.

Hemins are well known to be differentrated from hemes by the fact that they have an $Fe^{3+}$ species complexed to the porphine center. Hemes have an $Fe^{2+}$ species complexed to the porphine center.

Phthalocyanines may be used in the practice of this invention. Phthalocyanines have the following structure:

They are primarily differentiated from porphine by the fact that nitrogen atoms bridge the four basic components of the macrocycle.

A wide variety of phthalocyanine compounds are useful in the practice of this invention. A phthalocyanine compound, like a heme compound described above, can be broken down into it phthalocyanine center and a component attached thereto. Such a component may be a peptide. The above given description of useful variations in a heme compound applies to a phthalocyanine compound as well as ethioporphyrins and sirohemes.

The chelates according to the present invention are useful for the transformation of CO, CS, or NO, for example, into more complex compounds such as $CO_2$, or $CS_2$. They are also useful for the degradation of these more complex compounds to the starting materials from which they may be formed (vide infra).

The inventors have discovered, for example, that by contacting CO, CS, or NO with $H_2O$, $NH_3$, $H_2S$ or $RNH_2$ in the presence of a chelate of the present invention that useful materials based on the following reaction scheme can be produced (no strict stiochiometry implied):

$$QZ + H_2X + chelate^{oxd} \rightarrow QZX + chelate^{red} \quad (1)$$

$$QZX + chelate^{red} \rightarrow QZ + H_2X + chelate^{oxd} \quad (2)$$

where
Q=C or N:
Z=O or S:
X=O S, NH or NR;
R=$C_1$ to $C_8$ alkyl group which may be linear, branched or cyclized.

(Note: $chelate^{oxd}$ and $chelate^{red}$ are not used here to indicate a specific oxidation state of the chelate but simply to indicate that an appropriately oxidized chelate can oxidize a QZ compound to yield a QZX product. This reaction reduces the chelate to a lower oxidation level represented as $chelate^{red}$. This same explanation, in reverse, applies to a $chelate^{red}$ reacting with a QZX substrate to produce a QZ product and $chelate^{oxd}$.)

Hence, the present invention provides a useful means for readily transforming QZ and QZX compounds into a wide variety of products.

Some specific examples of reactions in accordance with the invention are given below. These examples are given for purposes of illustration of the invention and are not intended to be limiting thereof. (No strict stoichiometry is intended by these examples.)

Hence, carbon monoxide is readily oxidized to carbon dioxide in the presence of water as follows:

$$CO + H_2O + chelate^{oxd} \rightarrow CO_2 + 2H^+ + chelate^{red}$$

Carrying out his reaction in the presence of $H_2S$ instead of $H_2O$ yields the following:

$$CO + H_2S + chelate^{oxd} \rightarrow COS + 2H^{30} + chelate^{red}$$

Substituting CS for CO in the two above reactions Yields COS and $CS_2$ respectively.

$$CS + H_2O + chelate^{oxd} \rightarrow COS + 2H^+ chelate^{red}$$

and $$CS + H_2S + chelate^{oxd} \rightarrow CS_2 + 2H^+ + chelate^{red}$$

Reacting carbon monoxide with ammonia in a non-aqueous solvent yields cyanic acid:

$$CO + NH_3 + chelate^{oxd} \rightarrow CONH + 2H^+ + chelate^{red}$$

When the reaction of CO and $NH_3$ in a non-aqueous solvent is followed by the addition of water, urea is formed in high yield:

$$CO + 2NH_3 + chelate^{oxd} \xrightarrow[\text{solvent}]{\text{non-aq.}} \xrightarrow{+H_2O} urea + chelate^{red}$$

Substitution of CO by CS in the above reaction yields thiourea:

$$CS + 2NH_3 + chelate^{ord} \xrightarrow[\text{solvent}]{\text{non-aq.}} \xrightarrow{+H_2O} (NH_2)CS_2 + chelate^{red}$$

In the presence of $H_2O$, NO can be oxidized to $NO_2$ as follows:

$$NO + H_2O + chelate^{oxd} \rightarrow NO_2 + 2H^+ + chelate^{red}$$

In the presence of a primary amine ($RNH_2$), CO can be transformed into an isocyanate.

$$CO + RNH_2 + chelate^{oxd} \rightarrow RNCO + 2H^+ + chelate^{red}$$

R represents a $C_1$ to $C_8$ alkyl group which may be linear, branched, or cyclized. For example R may be: methyl, ethyl, propyl, butyl, pentyl, hexyl, heptyl, octyl, or any branched isomer thereof. Examples of such isomers are iso-propyl, iso-butyl, tert-butyl, iso-pentyl, 2- or 3-methyl butyl, 2,2- or 3,3- or 2,3-dimethyl butyl, or 2-, 3-, or 4-methyl pentyl, or 2-ethyl-butyl, or isocytyl. The above isomers are only given as example, anyone skilled in this art will readily recognize other isomers. R may also be cyclopentyl, cyclohexyl, cycloheptyl or cyclooctyl.

One advantageous aspect of this invention is the fact that these chelates-based systems can be controlled to either transform simple compounds to more complex ones or to do the opposite (degrade complex compounds). Accordingly, all of the above reactions can be catalyzed in the opposite direction.

For example, $CO_2$ can be reduced to CO as follows:

$$CO_2 + chelate^{red} \rightarrow CO + chelate^{oxd}$$

The following discussion is presented strictly as a theoretical rationalization of the processes of the invention and is not intended, in any way, to be limiting of the present invention. Moreover, it must be recognized that for the sake of simplicity, CO and $H_2O$ will be used as an exemplary substrate and that all transformations described herewith are likewise obtained for various combinations of CS and NO, and $NH_3$, $RNH_2$ and $H_2S$, except where so noted.

By observing the above reactions in both the forward and reverse direction, the inventors discovered that the chelate is essentially reduced by what may be represented as an equivalent of the water-gas shift reaction:

$$CO + H_2O \rightarrow CO_2 + 2H^+ + 2e-$$

where the reaction does not require dioxygen.

It can be envisioned that the reduction of the chelate is ultimately the reduction of the chelating agent and/or its metal ion by carbon monoxide:

$$chelate^{oxd} + CO + H_2O \rightarrow CO_2 + 2H^+ + chelate^{red}$$

A CO-driven metal reduction as represented above is most probably thermodynamically favorable, but the apparent requirement for the oxidized chelate to bind CO adequately to catalyze this reaction made this reaction intuitively unattractive since CO was believed to inactivate the binding sites of hemes.

The inventors have, however, discovered that the reduction of the chelates of the invention is directly coupled to the oxidation of CO to $CO_2$ and that the process occurs in the absence of dioxygen. Therefore, in spite of this intuitively unattractive scenario, the inventors have discovered that a chelate which is able to bind CO (or CS or NO) can catalyze the transformation of this CO (or CS or NO) into COX (CSX, or NOX compounds respectively; with X as defined above.

These observations relate to the basic aspects of this invention.

These chelate mediated transformations can be run with only one catalytic turnover of the chelate. (These transformations result in an effectively stoichiometric reaction between the chelate and the substrate.) In this case, an oxidized form of the chelate is made to react with a QZ specie to yield a reduced chelate and a QZX product. This is illustrated below (no stoichiometry implied):

$$chelate^{oxd} + H_2X + QZ \rightarrow chelate^{red} + QZX$$

For example, CO and water or ammonia can be used in this system. Under these circumstances one observes the following reaction:

$$chelate^{oxd} + H_2O + CO \rightarrow chelate^{red} + CO_2 + 2H^+$$

or $$chelate^{oxd} + NH_3 + CO \xrightarrow[\text{solvent}]{\text{non-aq.}} chelate^{red} + HNCO$$

In the reaction of $NH_3$ and CO, if the product (i.e., HNCO) is subsequently treated with $H_2O$ one readily obtains urea in good yield.

Conversely, the inventors have observed that when the chelates of the present invention (in an appropriate reduction state) are put into contact with a reducible species e.g., QZX, the chelate is oxidized with a concomittment reduction of the reducible specie. This is illustrated below.

$$QZX + chelate^{red} \rightarrow QZ + H_2X + chelate^{oxd}$$

It will be appreciated that the reduced form of the chelate ($chelate^{red}$) will readily reduce, for example, $CO_2$ to CO. This is illustrated below (no stoichiometry implied):

$$chelate^{red} + CO_2 \rightarrow chelate^{oxd} + CO$$

In a preferred embodiment of the invention the chelates are used in conjunction with a means for oxidizing $chelate^{red}$ to $chelate^{oxd}$ thus promoting the transformation of a QZ substrate to a QZX product catalytically. In catalytic mode, the chelate undergoes a redox change from an oxidized state to a reduced state. Once reduced, the chelate can be reoxidized by an appropriately chosen oxidizing means. Reoxidation of the chelate permits another catalytic turnover transforming another QZ substrate molecule into a QZX product. In such a manner one obtains a catalyst system which transforms QZ into QZX. This catalyst system is illustrated below: (No strict stoichiometry is implied.)

The appropriate means for oxidation may be chemical or electrochemical.

Chemical oxidants are well known in this art. Examples of useful chemical oxidants are inorganic oxidants such as dioxygen, $K_3Fe(CN)_6$, biochemical oxidants such as any of the mitochondria electron transport proteins, other cytochromes, flavins, or organic oxidants such as nicotinamide adenine dinucleotide (NAD) ortho- and para-quinones, or phenazine methosulfate (PMS). It will be recognized that mixtures of these oxidants can also be used.

Alternatively, the oxidative regeneration of the chelate may be achieved by electrochemical means. In this embodiment of the invention, the catalyst system is driven by the introduction of an electrode (anode) into the catalyst mixture as is well known, e.g., in the art of oxidizing/reducing hemes.

With an electrochemical oxidation system, the chelate may be anchored to the electrode by appropriate means. It will be recognized that the oxidation of the chelate via electrode may readily occur when the chelate and the electrode are not in direct physical contact with each other.

Electrochemical oxidation of metalloporphines, their derivatives and their protein complexes has been well documented in the chemical and biochemical literature. Oxidation has been carried out using carbon, gold, platinum, mercury, and tin as common electrode materials, and the metals have been used in a variety of forms; foils, sponges (or foams), grids, wires, fibers, meshes and thin-films. A number of protic and aprotic solvents have been used, including $CH_2Cl_2$, DMF, DMSO, pyridine, methylimidazole, $EtCl_2$, AcCN, benzonitrile, dichloroethane, THF, $H_2O$, propylene carbonate, $CHCl_3$, $CCl_4$, and others. In addition to direct oxidation by the electrode, another component may be added to the system to transfer electrons from the metalloporphine to the electrode. A number of different chemical "mediators" are known, including inorganic complexes i.e. $Fe(CN)_6^{3-}$, and organic compounds, for example tetramethylphenyldiamine, phenazine methasulfate, methyl viologen, and 4,4-bipyridyl. There are many examples of other mediators. The choice of electrode, metalloporphine, mediators, solvent, and the electochemical potential used depends on the reaction that one wishes to perform. The electrochemical potential must be adequate to oxidize the metalloporphine, which must in turn be appropriate for the chemical reaction. The solvent must be able to dissolve the chelate (metalloporphine or similar compound) as well as the reactants, and any other necessary electrolytes. For example, protoporphyrin IX has a midpoint potential of 0.78 with zinc as its metal, and −0.39 with manganese in the metal site. A reaction with a potential of 0.8 would be better catalyzed by the zinc porphine than the Mn porphine, and would require a solvent and electrode stable at that potential (not DMSO as a solvent or Hg as an electrode, for example). The $CO/CO_2$ reaction has a listed potential of −0.12 while the $NO/NO_2$ reaction has a potential of about −0.08, both compatible to that of hemin at −0.09. The other reactions vary widely, so a wide range of metalloporphines is useful.

As can be seen from the above illustration the use of an oxidizing agent in combination with a chelate catalyze the conversion of CO and $H_2O$ to $CO_2$ catalytically, for example.

In other embodiments, these chelates can catalyze the production of COS from CO and $H_2S$ (X=S), the production of $CS_2$ from CS and $H_2S$ (X=S), the production of CONH from CO and $NH_3$ (X=NH) and the production of RNCO from CO and $RNH_2$ (X=NR) with R as defined above.

Substitution of the means for oxidizing by means for a reducing transforms the system into a reduction catalyst system.

This reverse process is schematically illustrated below (no strict stoichiometry implied):

In this embodiment of the invention the oxidized form(s) of the chelate complex may be reduced by appropriate means, such as, electrochemical reduction or chemical reductants.

Chemical reductants are well known in this art. Examples of useful chemical reductants are inorganic reducants such as $NaBH_4$, $NaB(CN)_3H$ or CaH, or organic reductants such as benzylviologen, methylviologen, dignat, 1,4-dihydro-nicotinamide adenine dinveleotide (NADH), formadine sulfonic acid, anthraquinone-$\beta$-sulfonate, or dithionite or biochemical reductants such as cytochromes, biotin, or floroproteins. It will be recognized that mixtures of these reductants can also be used.

Alternatively, the reductive regeneration of the chelate may be achieved by electrochemical means. In this embodiment of the invention, the catalyst system is driven by the introduction of an electrode (cathode) into the catalyst mixture as is well known, e.g., in the art of oxidizing/reducing hemes. The procedure for reducing the hemes of the invention is generally similar to desciption given for the oxidation of the hemes with variations which are known and easily recognized by those skilled in this art.

With an electrochemical reduction system, the chelate may be anchored to the electrode by appropriate means. (It will be recognized that the reduction of the chelate via electrode may readily occur when the chelate and the electrode are not in direct physical contact with each other.)

The chelates of the present invention can be used by themselves so that only one chelate is used. Alternatively, a combination of different chelate types can be used.

In one embodiment of the invention a single type of chelate may be use in an appropriate solution. The concentration range of the chelate is only governed by the desired performance of the catalyst system. Hence concentration which fall in the range of from about $10^{-12}M$ to about $10^1M$ or saturation may be used, with a concentration range of $10^{-5}M$ to $10^{-1}M$ being preferred.

In another embodiment of the invention, a mixture of more than one specie (or type) of chelate may be used in an appropriate solution. In this application of the invention the concentration range of these chelates and the types of combinations of chelates used are only governed by the overall catalytic performance of the system. The concentration range for each chelate may be in the range of $10^{-12}$ M to about 10 $M^1$ or saturation, with preferred concentrations falling between $10^{-5}$ M to $10^{-1}$ M The total chelate concentration, however, may exceed $10^1$ M.

Usable solvents are only limited by the catalytic performance of the system taken as a whole. Useful solvents are, for example, water, 1-methylimidazole, benzene, toluene, dimethylformaminde (DMF), acetonitrile, $C_1$ to $C_3$ alcohols which may be linear or branched, acetone, dimethyl sulfoxide, $C_1$ to $C_4$ amines which may be linear, cyclized or branched, $C_2$ to $C_6$ thiols, $C_2$ to $C_6$ mercaptans, ammonia, and $C_2$ to $C_6$ ethers which may be linear or branched. These solvents may be used by themselves or in combination with each other.

An organic solvent may be used in combination with water. If desired, more than one organic solvent may be used in conbination with water or two or more organic solvents may be used together in the absence of water. Such mixtures may be one phase or multi-phase systems. It will be recognized that with a multi-phase solvent system, phase tranfer catalyst which are well known in chemistry, can be used.

Preferred solvents are water, ammonia, DMF, benzene, toluene, $H_2S$, $CS_2$, NCOH and 1-methylimidazole.

It is within the scope of the invention to use at least one substrate as a solvent, e.g., $H_2O$ in the oxidation of CO to $CO_2$.

In another embodiment of the invention the chelate(s) may be immobilized on a non-soluble or partially soluble support.

A single specie of immobilized chelate can be used. There is no limit to the amount of a particular chelate which may be immobilized on a solid or semisolid support. (It is easily recognized in this art that varying quantities of chelate may be immobilized on any particular support.) Any support which is compatible with chelate reactivity may be used. Hence the chelates may be immobilized on a synthetic or natural polymer structure, ceramic, metal (e.g., Pt), metal oxide, synthetic or natural fiber, zeolite, silica compound, alumina compound, charcoal, glass, or gels. The quantity of chelate immobilized is limited only by the character of both the support and the chelate. Any quantity of chelate which may be immobilized on a suitable support is within the scope of the invention. These immobilized chelates may be used with concentration ranges of $10^{-12}M$ to about $10^1M$ or saturation, with $10^{-5}M$ to $10^{-1}M$ being preferred. (Concentration of immobilized chelate is defined herein as the number of moles of chelate per liter of solution containing the immobilized chelate.)

In another embodiment of the invention more than one single specie of a chelate immobilized on a solid or semi-solid support can be used. (It will be further recognized that the above description is not intended to be limited to a particular support.)

This embodiment can be particularly useful if two concommitant catalytic reactions are desired, where one chelate may be chosen for its particular ability to catalyze one reaction, and another chelate may be chosen for its particular ability to catalyze the other reaction. It is, of course, also within the scope of the invention to use more than one type of chelate when such chelates may have cooperative characteristics which result in the improvement of the catalytic performance of the system, even when only one catalytic transformation is sought. The solid and semi-solid support materials to which the chelates of the invention may be immobilized are well known in the art and may be, for example, glass, charcoal, woven fabric, proteinaceous material, synthetic polymers and gels, natural polymers and gels, ceramics, metals (e.g., Pt), metal oxides, natural or synthetic fibers, synthetic or natural polymers, zeolites, silica compounds or alumina compounds.

The solution suitable for use of these chelates can be used at any pH range appropriate for the catalytic performance of the chelate. The pH range of the solutions is only limited by the catalytic performance of the system considered as a whole. The pH range of aqueous solutions which can be used is, for example, between 4 and 14 preferably 6 and 10.

Buffers may be used to help maintain a particular pH range. These buffers are well known in the art, and are, for example: 2-hydroxyethylpiperazine-N'-2-ethane sulfonic acid (HEPES), ethylenediaminetetraacetic acid (EDTA), $NaHCO_3$, N-2-acetomido-2-aminoethanesulfonic acid (ACES), N-2-acetamidoiminoacetic acid (ADA), 2-amino-2-methyl-1,3-propanediol, N,N-bis(2-hydroxyethy)glycine (Bicine), [bis-(2-hydroxyethyl)]-tris(hydroxymethyl)methane (BIS-TRIS), 3-(cyclohexylamino)propanesulfonic acid (CAPS), cyclohexylaminoethanesulfonic acid (CHES), 2,2-diethyl malonic acid, glycine amide, N-2-hydroxyethylpiperazine-N'-2-ethanesulfonic acid (HEPES), N-2-hydroxyethyl-piperazine-N'3-propanesulfonic acid (HEPPS), homocitric acid, imidazole, dl-isocitric acid, bis-(2-amino methylphenoxy)ethane-N,N,N',N'-tetraacetic acid tetraacetoxy methyl ester (MAPTAN), 2-(N-morpholino)ethanesulfonic acid (MES), 3-(N-morpholino)-propanesulfonic acid (MOPS), potassium phosphate, sodium phosphate, phosphosaline buffer (PBS), piperazine-N-N'-bis-(2-ethane sulfonic acid) (PIPES), succinic acid, 3-{[tris-(hydroxymethyl)-methyl]-amino} propane sulfonic acid (TAPS), 2-{[tris(hydroxymethyl)methyl]amino }ethane- sulfonic acid (TES), tetramethyl ammonium hydroxide, tricine, triethandamine, and tris-(hydioxymethyl)-amino methane (Tris).

Polyanions, such as inositol hexaphosphate can be used in combination with the chelate catalyst system to improve catalyst efficiency. Such polyanion additives may be used with only one polyanion species present or as a combination of several polyanion species. The quantity of polyanion used should generally be on a molar order relative to the chelate present and is preferably used in a slight molar excess thereof. Such polyanions are well known in the art.

In another embodiment, these catalytic reactions may be run with at least one reaction component in the gas phase. The chelates of the invention can be exposed to a gas or gaseous mixture so that they promote the transformation of one or more components of this gas or gas mixture. In this mode of operation, the chelate can be immobilized or affixed on a solid support matrix and used either with a means for oxidation or a means for reduction. In this mode of operation, the chelate need not be used in a solvent.

Note that all reaction components, with the exception of the chelate, may be in the gas phase. So, for example:

readily occurs. This embodiment of the invention is particularly useful for automobile "catalytic converter" types of applications and similar applications which require the transformation of gaseous QZ or QZX species.

One preferred embodiment of these gaseous reactions include the immobilization of the chelate onto an electrode (or anode or a cathode).

The concentration of the species being oxidized has no practical limits; it may be very low or very high. With CO, for example, CO pressure can range over a wide range of pressures: from trace amount of CO to up to about 100 atmospheres CO. Similar concentration ranges can be used for compounds other than CO; e.g., CS or NO. CS concentrations from trace quantities to saturation may be used. A NO concentration range to CO described above can be used.

The concentrations of the species being reduced has likewise not practical limits. For example, $CO_2$ concentration may be up to about 73 atm at 31° C., and 55 atm at 20° C. Trace qualities of $CO_2$ are likewise readily oxidized.

Any of the above-described reactions can be run within a temperature range compatible with the catalytic performance of the system as a whole. This temperature range will vary depending on the character of the chelate used but may be between 0° C. and 360° C., with 10° C. to 150° C. being generally preferred.

The invention will now be further described with specific examples which are given for purposes of illustration and are not intended to be limiting of the scope of the invention.

EXAMPLE 1

The Catalytic Oxidation of CO to $CO_2$ by Hemoglobin, $K_3Fe(CN)_6$ and $H_2O$

To test for $CO_2$ production by oxidized hemoglobin under CO, methemoglobin (metHbA) with a molar excess of oxidant $K_3Fe(CN)_6$ is repetitively deoxygenated and saturated with carbon monoxide. The sealed metHbA sample is left at room temperature under a slight positive carbon monoxide pressure for several days. The concentration of gaseous carbon dioxide is monitored at regular intervals. By constantly reoxidizing the heme, the carbon dioxide production is not limited by lack of oxidized heme. The percentage concentration of carbon dioxide in the gas phase above a carbon monoxide saturated solution containing metHbA with $K_3Fe(CN)_6$ is found to increase steadily, amounting to 1.8% after 24 hours, 6.2% after 48 hours, and 15% after 72 hours. Control solutions under carbon monoxide containing either reduced (ferrous) HbA or $K_3Fe(CN)_6$ alone show no carbon dioxide formation, showing that the production of carbon dioxide requires both oxidized heme and carbon monoxide.

EXAMPLE 2

The Catalytic Reduction of $CO_2$ to CO by Ferrous Hemaglobin A (HbA) and Formadine Sulfonic Acid The back reaction of the oxidation of carbon monoxide is demonstrated with formadine sulfonic acid (FSA) as an added reductant. If FSA, ferrous HbA (either oxy or deoxy), and sodium carbonate are incubated together in buffered solution, within a few hours the HbA becomes a mixture of ferrous carbon monoxide-HbA and ferric HbA, demonstrating the production of carbon monoxide and oxidation of the heme. Because FSA only very slowly reduces the oxidized heme, it is possible to observe simultaneously both the oxidation of heme and the production of carbon monoxide associated with a back reaction.

Figure 1:
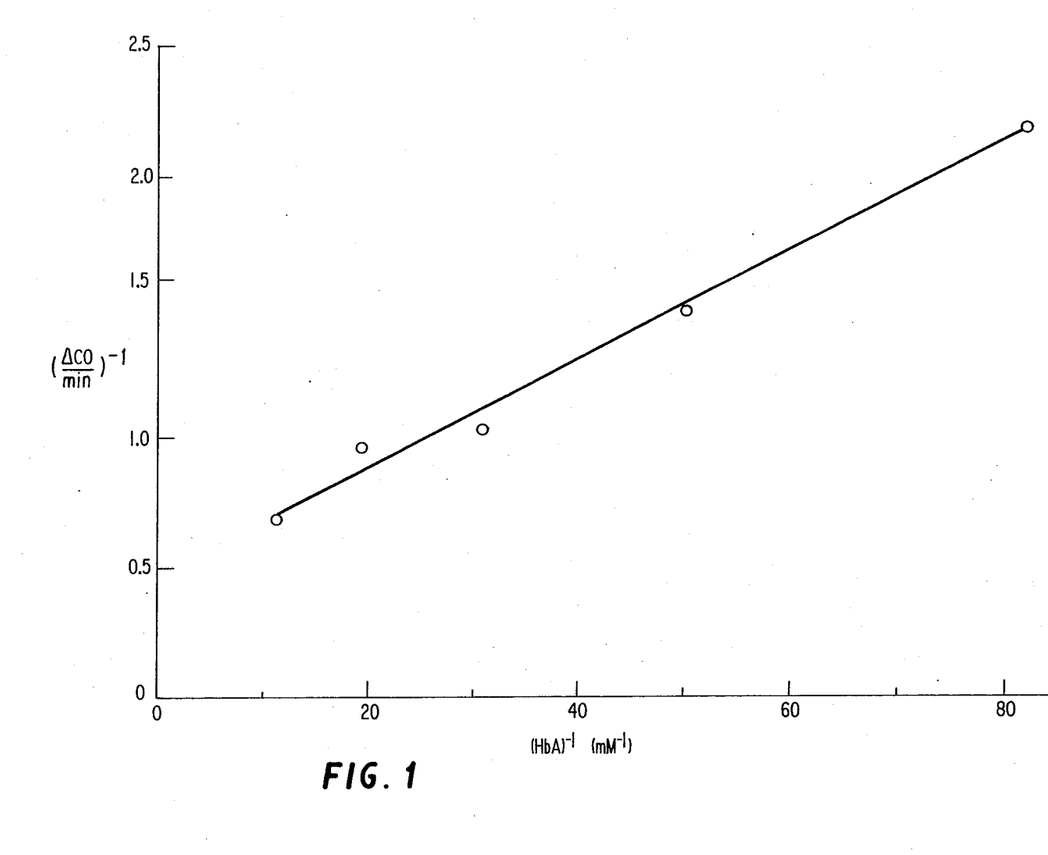
FIG. 1 shows the rate of CO formation by the back reaction of the CO-driven reduction at different concentrations of hemoglobin A (HbA).

A modification of the experimental condition make it possible to quantify the rate of carbon monoxide production. If a reductant like dithionite, which reduces HbA is added, then any HbA oxidized by the reaction is reduced, and the formation of carbon monoxide will occurs. The rate of carbon monoxide production is measured by observing the rate of HbA-CO formation: this is shown in FIG. 1.

EXAMPLE 3

The Oxidation of CO to $CO_2$ by Other Chelates in a Non-Catalytic Fashion

The production of $CO_2$ with samples of oxidized forms of cytochrome c oxidase, hemoglobin, and isolated heme proceeds readily under CO. In the case of cytochrome c oxidase, the oxidized enzyme is first carefully degassed and saturated with CO. The initial CO and residual $CO_2$ and $O_2$ concentrations are then determined by mass spectroscopy, and determine again after 24 hours. Results are shown in Table I.

TABLE I $CO_2$ Formation during CO-Driven Reduction of Cytochrome c Oxidase. The gas concentrations above degassed and CO-saturated cytochrome c oxidase solutions are measured by mass spectroscopy (see Methods). The range of values found with repeated measurements of the same sample are indicated.

|  | After 30 min. | After 21 hours |
|---|---|---|
| CO | 44.99 mM (99.984%) | 44.90 mM 99.78%) |
| $O_2$ | 4.5 $\mu$M ± 2 (0.01%) | 10.9 $\mu$M ± 3 0.024%) |
| $CO_2$ | 2.6 $\mu$M ± 1 (0.006%) | 87 $\mu$M ± 5 (0.20%) |

Note that while the $CO_2$ concentrtion increases over 30-fold, there is no decrease in the $O_2$ concentration. Control experiments carried out in the absence of chelate show no $CO_2$ production.

From the gas and solution volumes and the pH, the total amount of $CO_2$ formed is estimated to be 9 micromoles. This is 3 to 4 times the amount predicted on a stoichiometric basis, based on knowledge of the number of cytochromes a and $a_3$ sites reduced.

EXAMPLE 4

$CO_2$ formation by CO-driven reduction of hemin

Heme was dissolved in 0.1 M tetramethylammonium hydroxide. Other conditions were as in Example 3.

| Sample | Observed [$^{13}CO_2$] | Predicted* [$^{13}CO_2$] |
|---|---|---|
| no heme | 0.9 $\mu$M | — |
| 800 $\mu$M heme prior to reduction | 12 $\mu$M | 0 |
| 800 $\mu$M heme after first reduction | 400 $\mu$M | 400 $\mu$M ± 50 $\mu$M |
| 800 $\mu$M heme after 64 reductions/reoxidations | 1900 $\mu$M | 2200 $\mu$M ± 200 $\mu$M |

Solution $^{13}CO_2$ concentrations were determined by mass spectroscopy (see Example 3). *Predicted $^{13}CO_2$ concentrations are based on the heme concentrations and the stoichiometry of the reaction (i.e., 2 hemes reduced/$CO_2$ formed). The range of values in the predicted $^{13}CO_2$ concentrations reflects the cumulative error in the heme concentration and volume measurement.

EXAMPLE 5

Relative Rates of CO-Driven Reduction

Reduction under a CO atmosphere is observed with several proteins and heme compounds. Table II describes relative half-times of reduction for a number of oxidized heme proteins or heme compounds incubated under CO, under similar experimental conditions.

TABLE II

Half-times for Reduction of Heme Compounds under CO. Protein and dipyridine- or dinicotinic acid-liganded heme solutions are in 0.1 M $KHPO_4$, pH 7.5, 0.1 mM EDTA at 25° C. Samples of cytochrome c oxidase also contain 1% Tween 80. Basic heme solutions are in distilled water with KOH. The samples are injected into sealed sterile cuvettes through a 5$\mu$ Millipore filter and saturated with CO. The rate and degree of reduction under 1 atmosphere of CO are determined by scanning the absorbance from 450 nm to 700 nm at regular intervals and measuring the change in absorbance at the wavelength with greatest change. The rate of hemin reduction is found to be $1.4^{-1}$ at 25° C., molarity is in terms of KOH concentration. Complete sample reduction is achieved by adding 15 mg of dithionite. "No reduction" indicates no detectable reduction after 200 or more hours under CO. See text for further details.

| Heme Compounds | Concentration $\mu$M heme) | Half-time for Reduction (hours) |
|---|---|---|
| Cytochrome c Oxidase | | |
| Cytochrome $a_3$ | 6 | 0.5 |
| Cytochrome a | 6 | 6 |
| Human Hemoglobin | | |
| HbA | 70 | 1000 |
| HbA + 200 $\mu$M IHP | 70 | 800 |
| HbA at 100 atmospheres CO | 70 | 40 |
| Sperm Whale Myoglobin | 70 | 1200 |
| Equine Cytochrome c | 15 | no reduction |
| Equine Catalase | 35 | no reduction |
| Horseradish peroxidase | 35 | no reduction |
| Hemin in 1 M KOH | 35 | 0.7 |
| Dipyridine heme | 35 | no reduction |
| Dinicotinic acid heme | 35 | no reduction |

The rates of reduction are not constant during the course of the reduction for cytochrome c oxidase, hemoglobin or isolated heme. The rates of reduction are also dependent on the temperature, pH, heme and CO concentrations. In Table II, for purposes of comparison, we report the time to 50% reduction for samples at the same temperature, pH, and CO concentration, and at similar protein concentrations. No heme reduction is detactable after 200 or more hours for solutions of catalase, cytochrome c (alone), or horseradish peroxidase, proteins that cannot bind CO even when reduced. (These results do not eliminate the fact that if appropriately modified, these heme proteins may produce derivatives which are likely to be able to display desired reactivity.) Isolated ferric heme in a high pH aqueous medium with no additional ligands also becomes reduced when incubated under CO. If the heme is liganded with pyridine or nicotinic acid, the reduction does not occur. Either heme or heme-proteins transferred into sterile cuvettes through 5 $\mu$ Millipore filters become reduced at the same rate as unsterile solutions. It is notable that cytochrome c oxidase, with multiple electron accepting sites, shows a much faster rate of reduction than other proteins studied.

EXAMPLE 6

CO-Driven Hemoglobin Reduction

Figure 2:
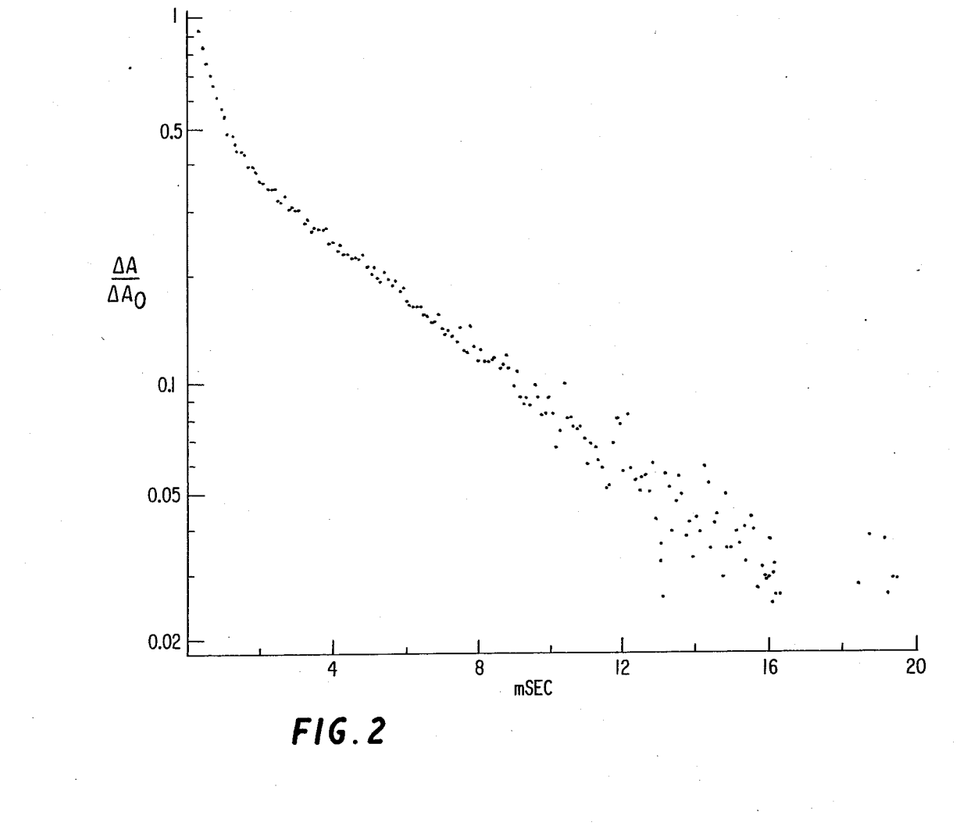
FIG. 2 shows kinetics of CO associated with HbA after metHbA was incubated for 14 days in CO-saturated, 0.1 M Tricine, pH 8.0, 0.1 mM EDTA at 20° C. The sample was 20% reduced (80% metHbA) at this time. Reassociation after complete flash photolysis was monitored at 437.5 nm.

The half-time of reduction of metHbA under CO is dependent on CO concentration. The time necessary for half-reduction is decreased 25-fold by an increase in CO pressure from one to 100 atmospheres. Table II shows that the rate of reduction is different for hemoglobin and myoglobin. To see if the alpha and beta chains of HbA also differed in their rate of reduction, we examined the spectral dependence of the CO recombination after flash photolysis at varying stages of the reductive process. Because the kinetics of recombination differ for the alpha and beta subunits, the contribution to the total absorbance change from each subunit can be determined at different wavelengths. At 437.5 nm, both chains contribute about equally to the total absorbance change. FIG. 2 shows a representative time course for the absorbance change at 437.5 nm, upon CO recombination after complete flash photolysis of partially reduced HbA. Since the fast and slow fractions observed for partially reduced samples of HbA are of approximately equal magnitude at this wavelength, we conclude that the alpha and beta subunits are reduced at similar rates.

Polyanions such as ionsitol hexaphosphate (IHP) shift the conformational equilibrium of HbA toward its low affinity (T) conformation. Under one atmosphere of CO, a small molar excess of IHP, about 1%, over heme consistently increases the rate of HbA reduction; decreasing the half-time for reduction by about 20%. Under 100 atmospheres of CO, the effect is noticeable only after about 75% of the HbA is reduced, at which point the rate of HbA reduction without IHP declines sharply. With IHP present, the rate of reduction decreases less quickly after the first three out of four heme groups are reduced.

EXAMPLE 7

CO-Driven Hemin Reduction

Figure 3:
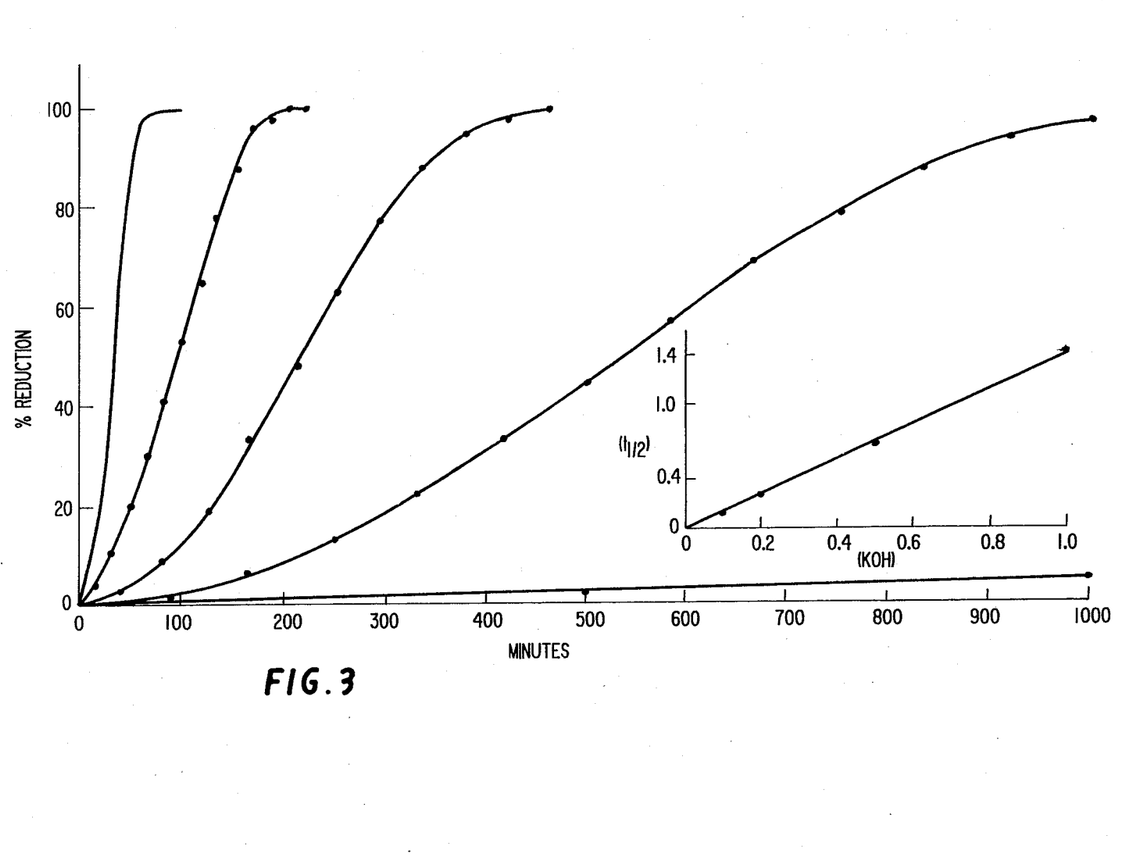
FIG. 3 shows hemin reduction at different KOH concentrations. Curves from right to left are for 0.05 M KOH, 0.1 M KOH, 0.2 M KOH, 0.5 M KOH and 1.0 M KOH. The reductions were monitored by recording the spectrum at regular intervals and measuring the change at 605 nm. Temperature was maintained at 25° C. Inset: The reciprocals of the half-times for hemin reduction are plotted against KOH concentration.
Figure 4:
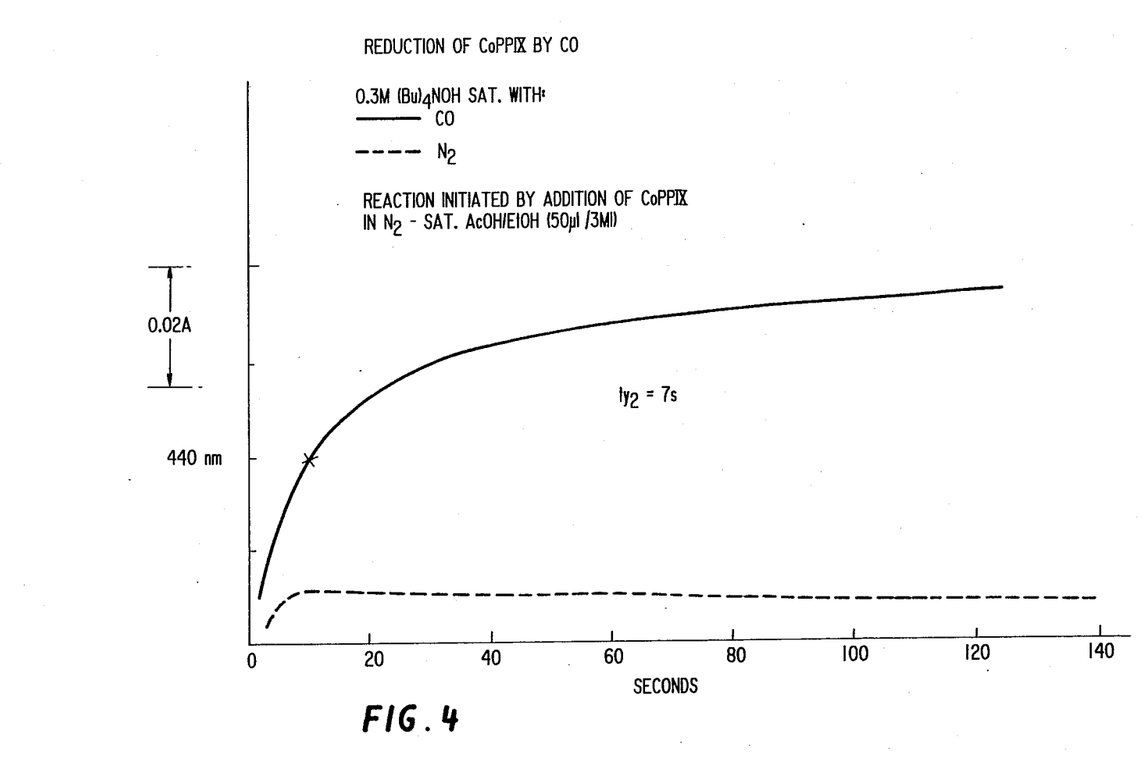
FIG. 4 shows the reduction of cobalt protoporphyrin IX (CoPPIX) by carbon monoxide.

As documented in Table II, hemin, freshly dissolved in basic solution, is reduced and binds CO when incubated under an atmosphere of CO. FIG. 3 shows the time courses of the reaction at varying concentrations of KOH. The rates for hemin reduction, as for metHbA reduction, vary during the course of reduction, giving distinctly sigmoidal curves when the percent reduction is plotted as a function of time. For hemin, the rates are symmetrical around the half-time, and average rates were therefore equal to the reciprocal half-times. As further shown in FIG. 3, for a given concentration of hemin, the rate of reduction is base-concentration dependent. Oxidized hemin dissolved in air equilibrated KOH solution for several hours prior to degassing and saturation with CO does not become reduced as quickly as freshly dissolved hemin. After "aging" for 24 hours, the hemin solutions do not become reduced under CO at any measurable rate.

Obviously, numerous modifcations and variations of the present invention are possible in light of the above teachings. It is therefore to be understood that within the scope of the appended claims, the invention may be practiced otherwise than as specifically described herein.

Well known oxidants can be found in the following references which are hereby incorporated in this application:

(1)

Handbook of Biochemistry,
Chemical Rubber Co.,
2nd Edition, 1973;

(2)

Handbook of Chemistry & Physics,
Chemical Rubber Co.,
52nd Edition, 1971.

What is claimed as new and desired to be secured by Letters Patent of the United States is:

1. A method for oxidizing carbon monoxide to carbon dioxide, comprising:
  (i) contacting, together, carbon monoxide, a nitrogen-containing chelating agent and water; wherein said chelating agent is at least one member selected from the group consisting of methmeoglobin bound to a support, ferric hemoglobin bound to a support, iron-containing porphyrins bound to a support, and sperm whale myoglobin bound to a support, wherein said support is glass, a natural fiber, a synthetic fiber, a gel, charcoal, carbon ceramic material, a metal oxide, a synthetic polymer, a zeolite, a silica compound or an alumina compound; and
  (ii) obtaining carbon dioxide.

2. The method of claim 1, wherein said carbon monoxide is in the gas phase.

3. The process of claim I, wherein said nitrogen-containing chelating agent is methemoglobin.

4. The method of claim 1, wherein said nitrogen-containing chelating agent is ferric hemoglobin.

5. The method of claim 1, wherein said nitrogen-containing chelating agent is sperm whale myoglobin.

6. The method of claim I, wherein said support is glass, a natural fiber, a synthetic fiber or a gel.

7. The method of claim 1, wherein said support is charcoal, a ceramic material or a metal.

8. The method of claim 1, wherein said support is a metal oxide, a synthetic polymer, zeolite, a silica compound or an alumina compound.

9. The method of claim 1, comprising oxidizing carbon monoxide to carbon dioxide in the presence of methylene chloride, DMF, DMSO, pyridine, methylimidzole, benzonitrile, dichloroethane, THF, propylene carbonate, chloroform, carbon tetrachloride, benzene, toluene, acetionitrile, a $C_{1-3}$ alcohol, acetone, a $C_{1-4}$ amine, a $C_{2-6}$ thiol, a $C_{2-6}$ mercaptan, ammonia, or a $C_{2-6}$ ether.

10. The method of claim 1, comprising using a pH of from 4 to 14.

11. The method of claim 1, comprising using a pH of from 6 to 10, and a buffer.

12. The method of claim 1, wherein said nitrogen-containing chelating agent is an iron-containing porphyrin.

13. A method for oxidizing carbon monoxide to carbon dioxide, comprising:
  (i) contacting, together, carbon monoxide, a nitrogen-containing chelating agent and water; wherein said chelating agent is heme bound to a support, or wherein said chelating agent is hemin, and said support is glass, a natural fiber, a synthetic fiber, a gel, charcoal, carbon, a ceramic material, a metal, a metal oxide, a synthetic polymer, zeolite, silica compound or an alumina compound; and (ii) obtaining carbon dioxide.

14. The method of claim 13, wherein said nitrogen-containing chelating agent is heme.

15. the method of claim 13, wherein said nitrogen-containing chelating agent is hemin.

16. The method of claim 13, wherein said support is glass, a natural fiber, a synthetic fiber on a gel.

17. The method of claim 13, wherein said support is charcoal, carbon, a ceramic material, a metal, a metal oxide or a synthetic polymer.

18. The method of claim 13, wherein said support is a zeolite, a silica compound or an alumina compound.

* * * * *